US008926101B2

(12) United States Patent  (10) Patent No.: US 8,926,101 B2
Nairn et al.  (45) Date of Patent: Jan. 6, 2015

(54) PROJECTION SYSTEM AND COMPONENTS

(75) Inventors: Rowan Nairn, San Francisco, CA (US); Philipp Schmaelzle, Los Altos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 929 days.

(21) Appl. No.: 12/778,396

(22) Filed: May 12, 2010

(65) Prior Publication Data

US 2011/0279739 A1  Nov. 17, 2011

(51) Int. Cl.
  *G09G 5/02* (2006.01)
  *H04N 5/74* (2006.01)
  *G09G 5/00* (2006.01)
  *G09G 3/02* (2006.01)
  *G03B 21/56* (2006.01)
  *H04N 9/31* (2006.01)

(52) U.S. Cl.
  CPC *G09G 3/02* (2013.01); *G03B 21/56* (2013.01); *H04N 9/3102* (2013.01); *H04N 9/3129* (2013.01); *H04N 9/3141* (2013.01); *G09G 2360/142* (2013.01)
  USPC ............. 353/79; 353/121; 345/205; 345/214; 345/51

(58) Field of Classification Search
  USPC ............ 353/79, 121, 122, 31; 349/24, 31, 32, 349/33, 204–207, 36–51, 55; 359/454, 459, 359/238, 325; 345/205, 206, 208, 214, 345/36–42, 44–47, 48–51, 55, 79, 77, 345/80–84
  See application file for complete search history.

(56) References Cited

U.S. PATENT DOCUMENTS

| | | | |
|---|---|---|---|
| 7,161,590 B2 * | 1/2007 | Daniels | 345/204 |
| 2003/0025458 A1 * | 2/2003 | Tuli | 315/169.3 |
| 2007/0035490 A1 * | 2/2007 | Johnson et al. | 345/81 |
| 2010/0053079 A1 * | 3/2010 | Kwon et al. | 345/156 |
| 2010/0060560 A1 * | 3/2010 | Sambandan et al. | 345/92 |
| 2010/0277490 A1 * | 11/2010 | Nam et al. | 345/581 |

OTHER PUBLICATIONS

Sanjiv Sambandan; Arokia Nathan, Circuit Techniques for Organic and Amorphous Semiconductor Based Field Effect Transistors, IEEE, pp. 69-72, Apr. 2006.

* cited by examiner

*Primary Examiner* — William C Dowling
(74) *Attorney, Agent, or Firm* — Marger Johnson & McCollom PC (57) ABSTRACT

A system including a plurality of pixels disposed on a substrate forming a screen. A signal, such as an image, can be projected on the screen. The pixels of the screen include a sensor configured to sense a portion of the signal, an emitter, and circuitry. In response to information sensed in the signal, the circuitry can be configured to drive the emitter.

16 Claims, 8 Drawing Sheets

PROJECTION SYSTEM AND COMPONENTS

BACKGROUND

This disclosure relates to a projection system and, in particular, to projection systems and components operating in multiple dimensions.

Images can be created in a variety of ways. For example, an image can be projected by a projector on a passive screen. In another example, a display, such as a liquid crystal display (LCD) can display an image. However, a high power illumination source is required in the projector to project an image, or as a backlight for the LCD.

In addition, display information is routed in the plane of the screen. For example, data lines for individual light emitting diodes (LED) of an LED screen, or the pixels of an LCD screen, or the like can be disposed along rows and columns of the screen. Thus, a large number of data lines can be present. Such a concentration of data lines can increase the chance of a failure of a pixel due to a failure anywhere along the data lines.

SUMMARY

An embodiment includes a system including a substrate; and a plurality of pixels disposed on the substrate. Each pixel includes a sensor configured to receive a first signal including information; an emitter; and circuitry configured to cause the emitter to emit a second signal in response to the information.

Another embodiment includes a projector including a light source configured to generate a carrier; a spatial modulator disposed to modulate the light; and a controller configured to cause the spatial modulator or the light source to modulate the carrier to encode an image and additional information.

DETAILED DESCRIPTION

Embodiments will be described in reference to the drawings. In particular, in an embodiment, pixels of a screen can receive information substantially outside of a plane of a screen.

Figure 1:
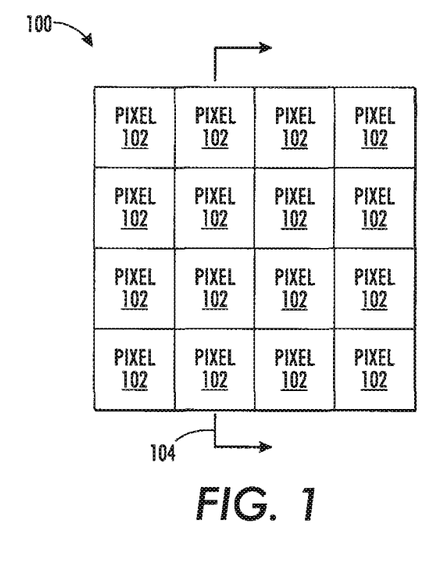
FIG. 1 is a block diagram of a screen according to an embodiment.

FIG. 1 is a block diagram of a screen according to an embodiment. The screen 100 includes a plurality of pixels 102. In this embodiment, the pixels 102 of the screen are in a rectangular array. However, in other embodiments, the pixels 102 can be in other arrangements, substantially random arrangements, different concentrations, or the like. For example, pixels 102 can be concentrated in a center of the screen 100. In another embodiment, the pixels 102 can be substantially randomly placed across the screen 100.

Figure 2:
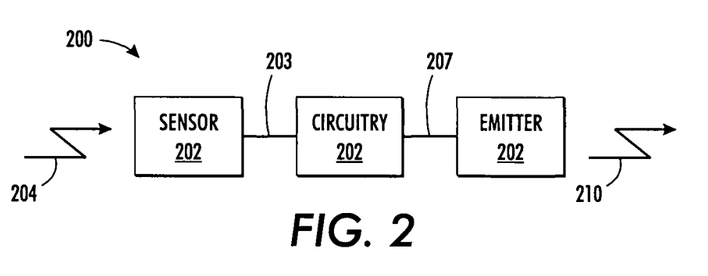
FIG. 2 is a block diagram of an example of a pixel of the screen of FIG. 1.

FIG. 2 is a block diagram of an example of a pixel of the screen of FIG. 1. Referring to FIGS. 1 and 2, in this embodiment, the pixel 200 includes a sensor 202, circuitry 206, and an emitter 208. Pixel 200 is an example of a pixel that can be used as pixel 102 of the screen 100.

The sensor 202 can be any variety of sensors. For example, the sensor 202 can include a sensor configured to sense visible light, such as a photosensor. In another example, the sensor 202 can be configured to sense non-visible signals. For example the sensor 202 can be configured to sense non-visible light such as infrared and ultraviolet light. The sensor 202 can be configured to sense other non-visible signals such as sound, pressure, chemical concentration, or the like. In another example, any sensor that can be configured to sense a signal with an amount of spatial resolution, such as a signal with a sufficiently short wavelength, can be used as a sensor 202. Moreover, the sensor 202 can include multiple sensors, different types of sensors, or combinations of such sensors.

The circuitry 206 can include any variety of circuitry. For example, the circuitry 206 can include an analog amplifier configured to amplify a signal received by the sensor 202. In another embodiment, the circuitry 202 can be configured to demodulate information encoded in a signal 204 received by the sensor 202. In another embodiment, the circuitry 206 can be configured to filter the signal 204, store the signal 204 in a memory, remodulate the signal 204, or the like. For example, as will be described in further detail below, an invisible signal can be received and remodulated to be transmitted as a visible signal 210. In another embodiment, the circuitry 206 can be configured to manipulate the signal 204, such as applying various computational functions to the signal 204. In another embodiment, the circuitry 206 can be configured to combine the signal 204 with signals received from other sensors 204, whether part of the pixel 200 or part of other pixels, signals stored in a memory, or the like. The circuitry 206 can be configured to perform any variety of such functions and combinations thereof.

The circuitry 206 can be implemented in a variety of ways. As will be described in further detail below, the circuitry 206 can be implemented on an integrated circuit with the sensor 202 and emitter 208. In another embodiment, the circuitry can be implemented in discrete electronics. Furthermore, in an embodiment, the circuitry 206 can be formed with a variety of techniques. For example, the circuitry 206 can be fabricated according to various semiconductor manufacturing techniques, such as those appropriate to creating thin-film structures. In another embodiment, the circuitry 206 can be formed by printing the components, layers, or the like on a suitable substrate. Any technique for fabricating electronics can be used to create the circuitry 206.

The emitter 208 can be a variety of emitters. For example the emitter 208 can include light emitters such as light emitting diodes (LED), organic LEDs (OLED), electroluminescent emitters, plasma emitters, or the like. In another example, the emitter 208 can include emitters for other frequency ranges, such as radio frequency ranges. In another example, the emitter 208 can include an audio emitter, whether audible by a human or not, such as a piezoelectric emitter. In another example, the emitter 208 can include a mechanical emitter, such as an electromechanical mechanism of a Braille display. The emitter 208 can include any variety of such emitters or combinations of such emitters.

Although the sensors 202 and emitters 208 have been described as discrete, such components can include common aspects. For example, the sensors 202 on a screen 100, a portion of the screen 100, or the like could have a common electrode, common active material, or the like. Similarly, the emitters 208 can have common aspects. Furthermore, the sensors 202 and emitters 208 can share aspects, such as a common electrode. Any combination of such discrete or combined structures can be used.

As illustrated in FIG. 2 the sensor 202 is coupled to the circuitry 206. The sensor 202 is configured to receive the signal 204. As described above, the sensor 202 can take a variety of forms such that the sensor 202 can receive the signal 204 in a variety of formats. The circuitry 206 is configured to process the sensed signal 203 and generate a drive signal 207 in response.

In an embodiment, the circuitry 206 is configured to drive the emitter 208 with the drive signal 208. Accordingly, the emitter 208 can be driven in response to the received signal 204. Each pixel 200 can include its own sensor 202, circuitry 206, and emitter 208. In an embodiment, the functions of the circuitry 206 can be substantially independent between pixels 102 of the screen 100. For example, the circuitry 206 of each pixel 200 may respond only to the signal 204 received through the corresponding sensor 204. Accordingly, when disposed in an array as in screen 100 of FIG. 1, each pixel 102 can respond substantially independently of the other pixels 102. However, as will be described in further detail below, a pixel 102 can be responsive to signals received by other pixels.

Figure 3:
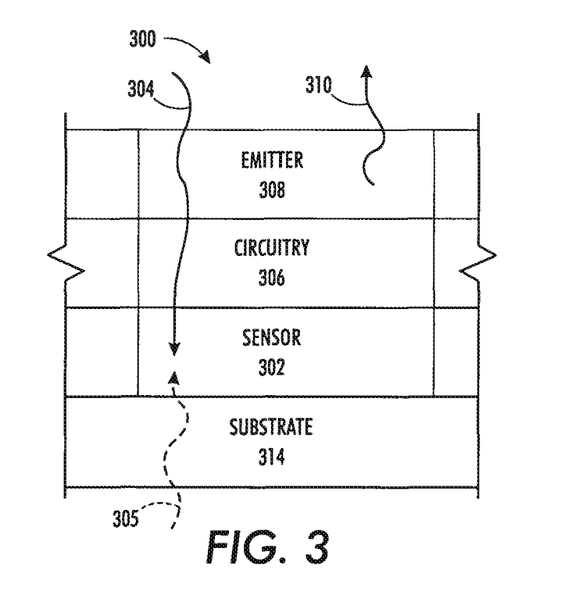
FIG. 3 is a block diagram of another example of a pixel of the screen of FIG. 1.

FIG. 3 is a block diagram of another example of a pixel of the screen of FIG. 1. FIG. 3 is an example of a cross-sectional view of the screen 100 of FIG. 1. Pixel 300 is an example of the pixel 102 of the screen 100 along cross-section 104. In this embodiment, the pixel 300 includes a sensor 302, circuitry 302, and an emitter 308 disposed on a substrate 314. In this embodiment, the sensor 302 is disposed such that a signal 304 can be received through the emitter 308 and the circuitry 306. For example, the emitter 308 and circuitry 306 can be substantially transparent to the received signal 304. In another embodiment, the sensor 302 can be configured to receive a signal 305 that does not pass through the circuitry 306 and sensor 308, for example, through the substrate 314. In another embodiment, the ordering of the sensor 302, the circuitry 306, and the emitter 208 can be different. Regardless of orientation, as described above, the circuitry 306 can process information encoded in the signal 304, signal 305, or the like. In response, the circuitry 306 can drive the emitter 308 to emit signal 310.

In an embodiment, the circuitry 306 can be configured to receive power along direction 312. That is, the power supplied to each pixel 300 can be supplied through the circuitry 306 of a screen 100 including the pixels 300. For example, power lines, power planes, or the like can extend through the circuitry 306 of the pixels 300. As a result, the vector of the power flow is substantially coplanar with a local arrangement plane of the pixels 300.

However, the signals 304, 305, or the like that are received by the pixel 300 can be received substantially orthogonal to the plane of the pixels 300. That is, in contrast to a display, such as an LED display, or liquid crystal display (LCD), the information used to actuate the emitters 306 can be received via a signal propagating in a direction that is substantially non-coplanar with a pixel or multiple pixels 300 in a location where the signal is incident.

In an embodiment, the received information can be described as substantially orthogonal; however, the received signal 304 can, but need not be precisely orthogonal, orthogonal to the entire surface of the screen 100, or the like. In other words, the signal 304 can be received from any direction substantially non-coplanar with the plane of the pixels 300. For example, the signals 304 may be projected at the screen 100 offset at an angle from orthogonal, yet still not within the plane of the pixels 300. Moreover, the pixels 300 may form a non-planar surface. For example, the pixels 300 may be disposed on a flexible substrate which has some curvature. Thus, the pixels 300 may follow a contour. However, the signal 304 received by each pixel 300 may still be received substantially non-coplanar with the power supplied along direction 312. That is, the angle of incidence of the signal 304 can vary across the surface, but still be substantially non-coplanar.

In an embodiment, as the information is received through the signal 304 or other similar signals, data lines for the transmission of information need not be present. That is, data lines, or other similar connections need not pass through other pixels 300 to supply information to a given pixel 300.

In an embodiment, a screen 100 formed of such pixels as described above can be more tolerant of physical stress. For example, a screen 100 may experience impacts, torsion, or the like. Such physical stress can cause a failure in individual data lines, especially data lines that extend the length or width of a screen. These failures can result in bad pixels, reduced reliability, etc. However, in an embodiment, data lines that extend across a screen may not be present. That is, since the information for an emission of a pixel can be sensed by the sensor 302, the information need not be transmitted across the screen 100 to the pixel 300. As a result, defects due to failures in data lines can be reduced if not eliminated.

Accordingly, the screen 100 can become more robust to physical stress that could otherwise damage the screen. For example, the screen can be formed on a flexible substrate. Accordingly the screen could be rolled for shipping purposes. The stress from rolling and unrolling can be insufficient to cause a failure due to the absence of such data lines. In another example, the screen can be included in a retractable projection screen. That is, the screen can be rolled up and down as desired.

Figure 4:
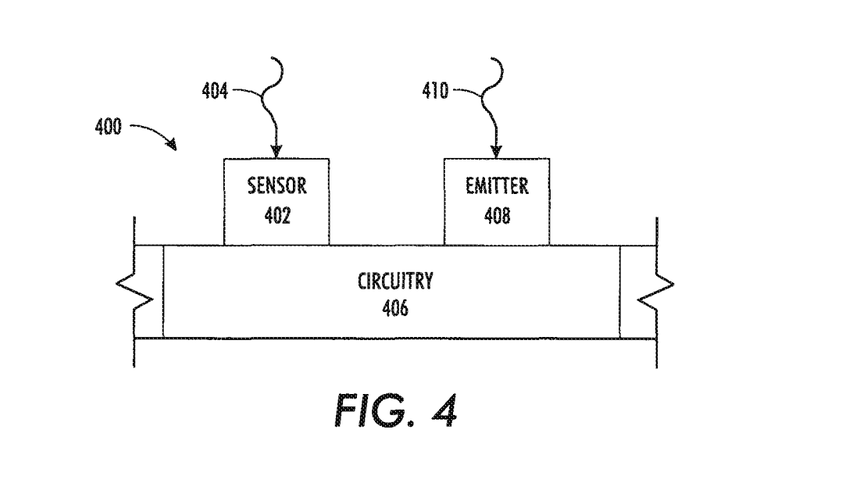
FIG. 4 is a block diagram of another example of a pixel of the screen of FIG. 1.

FIG. 4 is a block diagram of another example of a pixel of the screen of FIG. 1. Pixel 400 is a cross-sectional view along cross-section 104 of another example of a pixel 102 of the screen 100 of FIG. 1. In this embodiment, within an individual pixel 400, the sensor 402 and the emitter 408 are disposed on the same side of the circuitry 406. In particular, neither the sensor 402 nor the emitter 408 obscures the other.

In an embodiment, the sensor 402 and the emitter 408 can be formed by different process technologies. For example, the manufacturing processes suitable to form a sensor 402 such as a photosensor can be substantially different from manufacturing processes used to form the emitter 408. The circuitry 406 can be formed from yet another manufacturing process.

As a result, the emitters 408 and sensors 402 can be formed using techniques that may not be suitable for each other, or a substrate with the circuitry 406. For example, a flexible substrate and circuitry may be formed with a technique that would form lower quality emitters 408 and/or sensors 402. In another example, a manufacturing process suitable for sensors 402 and emitters 408 may have relatively higher manufacturing costs for the circuitry 406. In another example, devices that would not be possible in the same process can be included.

Accordingly, circuitry 406 can be formed the on a substrate that uses lower cost manufacturing techniques. Higher cost sensors 402 and emitters 408 can be diced and mounted on the circuitry 406, a supporting substrate, or the like.

Moreover, the sensors and emitters can be formed combinations of various techniques. For example, a sensor 302 and circuitry 306 can be formed as described with reference to FIG. 3. However, the emitter can be similar to the emitter 408 of FIG. 4. That is, the sensor 302 can have a scope substantially similar to that of the pixel 300; however, the emitter 408 may have a smaller scope, overlapping only a portion of the sensor 302. In another example, the emitter 408 of FIG. 4 could be mounted on the sensor 402. The sensor 402 can be mounted on the circuitry 406. Any combination, stacking, orientation, or the like can be used.

Figure 5:
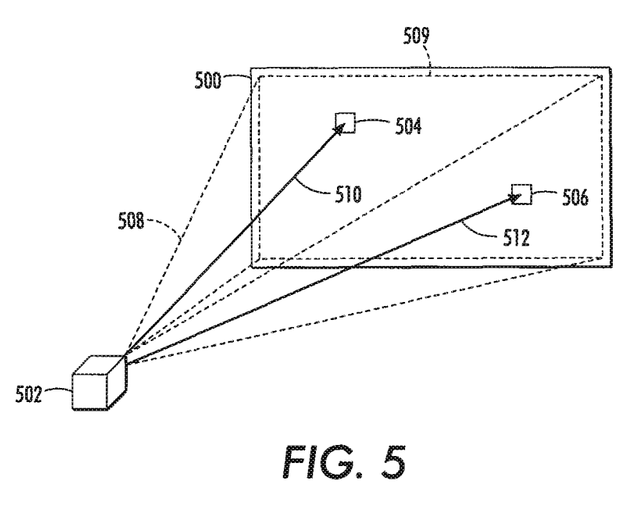
FIG. 5 is a bock diagram of a projection system according to an embodiment.

FIG. 5 is a block diagram of a projection system according to an embodiment. In this embodiment, the projection system includes a projector 502 and a screen 500. The projector is configured to emit a signal 508 that creates a projection 509 on the screen 500.

The signal 508 can include information. The information can be encoded in a variety of ways. For example, the information can be an amplitude modulation of the signal 508. The information can also be encoded by frequency separation, such as in multiple spectra. For example, the signal 508 can include a red signal, a green signal, and a blue signal. Each of the different color signals can be modulated with information. As will be described in further detail below, a variety of modulation techniques can be used. Amplitude modulation, phase modulation, frequency modulation, or the like can be used. Channel division techniques, such as time division multiplexing, frequency division multiplexing, spread-spectrum techniques, such as direct sequence spread-spectrum, and frequency hopping spread-spectrum, code division multiple access, or the like can be used. The circuitry of the pixels of the screen 500 can be appropriately configured to receive and extract information encoded within the projections 508.

In an embodiment, projector 502 can be an optical projector configured to project a visible image. Although the projector 502 could project different signals as will be described below, an optical projector will be used as an example. Accordingly, the signal 508 includes rays of light emanating from the projector 502. Within the signal 508 are rays 510 and 512. Rays 510 and 512 are incident on pixels 504 and 506 of the screen 500. Although the term ray has been used to discuss the directionality of portions of the signal 508, the rays 510, 512, or the like can have a non-zero solid angle.

In an embodiment, the pixels of the screen 500 are configured to amplify the incident light. For example, pixel 504 can receive ray 510 and emit a higher power optical signal that has substantially the same spectrum as the incident ray 510. The circuitry of pixel 504 can be configured to extract color information from the incident ray 510 and control the corresponding emitter to emit colors based on the color information.

Similarly, pixel 506 can receive ray 512 and emit a corresponding higher power optical signal in response. As each pixel of the screen 500 can be so configured, the projection 509 on the screen 500 can be amplified. Thus, a projection 509 that on a passive surface may be too dim to view, can be amplified such that the emission is visible.

In other words, the screen 500 can act as a two-dimensional signal amplifier. That is, the two-dimensional projection 509 can be amplified. Each pixel of the screen 500 can receive and amplify a corresponding portion of the projection 509.

In an embodiment, the projector 502 can be a lower power projection. For example, the projector need not have a sufficient output intensity to be visible, have sufficient projected brightness for the setting, or the like. However, as the screen 500 can amplify the signal 508, a higher power projector is not necessary. As a result, high power lamps, LEDs, or other illumination sources need not be used in the projector 502.

In particular, in an embodiment, a hand held device can be used as the projector 502. As a hand-held device can have a limited power supply, such as a battery, power supplied through a USB charging cable, or the like, the hand-held device may not be able to project a high intensity image. However, as described above, the screen 500 can respond to the lower power signals. Moreover, the location of the higher power consumption from the generation of the higher intensity image can be transferred to the screen, relieving the handheld device of the higher power requirements.

In addition, as an image and other information can be encoded in modulation techniques beyond intensity or amplitude modulation, the encoded image and/or information can be distinguishable from ambient light. For example, amplitude modulation can be used, but the amplitude can convey a digitized representation of the color of the image, rather than the amplitude of the color signal itself. As a result, ambient light that may have otherwise been amplified can be treated a noise and hence distinguished from the actual signal.

Furthermore, the amplification can be performed across an area larger than that of a corresponding area in the projector 502. For example, in a projector 502, to get the desired projected intensity, a high powered light or LED can be used for all or a substantial portion of a projected image. Thus, the energy density can be relatively high. However, in an embodiment, since the amplification occurs on a pixel basis, the power is distributed across the screen. That is, the power consumption and emission is distributed across the screen, rather than being concentrated one or a few locations. Thus, the energy density can be relatively lower.

In an embodiment, the projector 502 need not project in a visible spectrum. For example, the projector 502 can be configured to project an infrared signal, an ultraviolet signal, or other non-visible spectrum. The pixels of the screen 500 can be similarly configured to receive such a non-visible signals and transmute the received signal into the visible spectrum. Furthermore, both the signal 508 and the emission from the screen 500 can be substantially non-visible.

For example, a red color amplitude signal can be encoded on an infrared carrier. The circuitry of the pixel can receive the infrared signal, decode the amplitude and emit a red signal with a corresponding amplified amplitude. Thus, the circuitry can perform wavelength translation of the incident signal.

In an embodiment, the various sensors, emitters, circuitry, substrate, or the like can be sufficiently transparent to the emitted or received signal. For example, an emitter and circuitry can be substantially transparent to a received signal. In another example, the emitter and the sensor can be disposed on the same side offset from each other. Thus, a signal can be received by a sensor and a signal can be emitted by an emitter. Accordingly, the emission of the pixels of the screen 500 can occur on a side of the screen on which the projection 509 is incident. That is, the screen 500 can act as a front projection screen.

Figure 6:
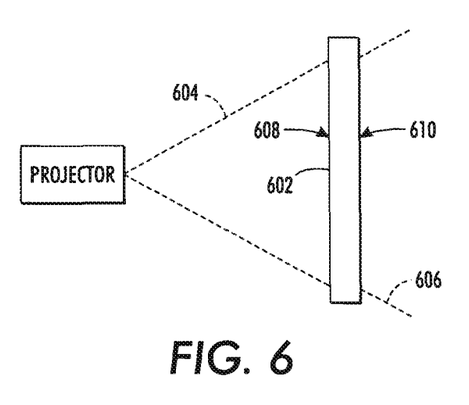
FIG. 6 is a block diagram of a projection system according to another embodiment.

FIG. 6 is a block diagram of a projection system according to another embodiment. In this embodiment, the screen 602 acts as a rear projection screen. For example as described above, the sensors of the pixels can be on opposite sides of the substrate from the emitters. A projector 600 can project a signal 604 on one side 608 of the screen 602. The amplified output signal 606 can be emitted from the other side 610.

Although visible image projection and amplification have been described above, the emitted signal and/or the received signal need not be light. For example, the screen 602 could include an array of antennas with each pixel including an antenna as an emitter. An appropriately phased signal can be projected on to the array. As a result, the screen can act as a phased array to achieve a desired radiation pattern. In another embodiment, the screen can include an array of audio emitters. Any array of discrete elements where substantially independent control is desired can be included in an embodiment.

Moreover, the medium of the received signal need not be identical or even similar to the medium of the emitted signal. For example, an optical signal can be encoded with the audio information to be emitted. The optical signal can be projected on to the array of audio emitters with appropriate optical sensors in the pixels. The audio emitters can be driven in response to information encoded in the received optical signal.

Furthermore, in an embodiment, the projection need not be created by a specially configured projector. That is, any source that can create a projection can be used. For example, the projector can be an LCD based projector, a laser based projector, a pico-projector, an 8 mm home movie projector, or the like. Any such projector can project an image on the screen 500, 602, or the like. Regardless of the source, the screen can amplify the projected image.

In particular, in an embodiment, a projector can be used with the screen in an application for which the projector would otherwise be unsuitable. For example, the projector can be used to create an image that has an intensity that is insufficient to view in a given environment. The projector may be projecting an image that is too large for the projector's lumen output when projecting on a passive surface resulting in an insufficient screen luminance, the environment may be too bright to view the projected image, or the like. The screen can amplify the projected image incident on the screen such that the desired image can be displayed.

In an embodiment, a projection artifact can be used to distinguish a projected signal from ambient light. For example, a projection can include artifacts such as a pulse from a scanning mirror laser projector. In another example, a blank interval between frames of a movie projector can introduce a blank pulse artifact into the projection. Such artifacts need not be inherent in the device. For example, a controller in an LED based a projector can modulate the LED's output to artificially introduce an artifact. In another example, a projector can be fitted with a shutter to introduce such an artifact. Regardless of the source, the artifact can be used to distinguish the projection from the ambient light.

Figure 7:
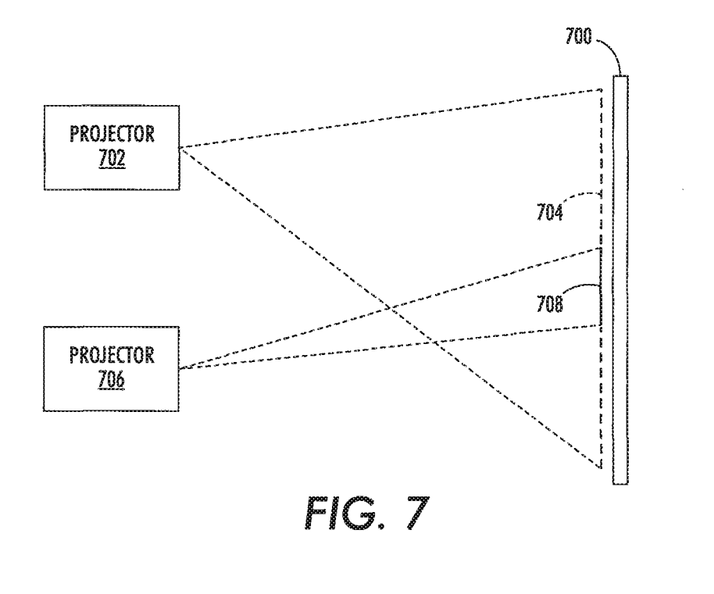
FIG. 7 is a block diagram of a projection system according to another embodiment.

FIG. 7 is a block diagram of a projection system according to another embodiment. In this embodiment, multiple projections can be incident on the screen 700. As illustrated, two projectors 702 and 706 each project an image on the screen 700. The projected images are illustrated as offset from the screen 700 for ease of illustration. Projection 702 projects projection 704 while projector 706 projects projection 708.

As describe above, in an embodiment, the projections can include additional information beyond image information. For example, an identification of the projector can be encoded in the projection. For example, the signals in projection 704 can be encoded to identify the signals as being emitted from projector 704. Similarly, the projection 708 can include signals that identify projector 706.

The pixels of the screen 700 can be configured such that the circuitry can extract the identification from the received information. Such identification can, but need not, be performed on a per-pixel basis. The emitters of the pixels can be driven in response to the information. For example, the pixels can be configured such that a projection from projector 706 has priority over a projection from projector 704. Thus, when the circuitry of a pixel identifies the projection 708 as emanating from projector 706, the corresponding emitters can be driven according to the projection 708, not the projection 704. That is, the projection 708 can replace the projection 704 for pixels on which the projection 708 is incident.

In another embodiment, other operations can occur in response to the identifications. For example, the projection 708 and the corresponding portion of projection 704 can be combined together. In another example, the signal of the projection 708 can cause an increase in brightness of the emission of the corresponding portion of projection 704. Any operation can be performed in response to the identification.

Each projection need not include information. For example, one of more of projections 704 and 708 incident on the screen 700 may not have an identification. The projection 704 may not identify projector 702 while the projection 708 may identify projector 706. The circuitry can control the emitters in response to such an absence or difference in identification.

Although an identification of a projection has been given as an example of additional information that can be conveyed with a projection, other information can be conveyed and the emissions of the pixels can be controlled in response. For example, in an embodiment, a priority value can be associated with the projected images. The screen 700 can respond to the priority. Projection 708 can be encoded with a higher priority. The screen 700 can decode the higher priority and display that projection 708.

In addition, with multiple projections, all of the projections need not include an image. For example, projection 704 may be an image; however, projection 708 is control information. Furthermore, this information can be included when there is only one projection. For example, the encoded information can include control information for the screen 700, audio information for attached speakers, or the like. Furthermore, the entire projection 704, for example, need not be encoded with additional information.

In an embodiment, the additional information beyond information related to an image can be referred to as meta-data. That is, the meta-data can be information about the image, such as an identification of the projector creating the image, a priority of the image, or the like as described above.

Figure 8:
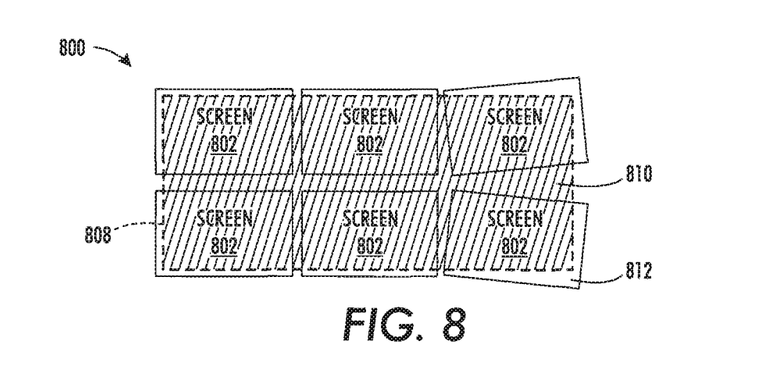
FIG. 8 is a block diagram of a tiled screen system with misaligned screens.

FIG. 8 is a block diagram of a tiled screen system with misaligned screens. In an embodiment, multiple screens can be disposed in a tiled array. The screen system 800 includes six screens as an example. A projection 808 is projected across the screens 802, 804, and 808. As each pixel in each of the screens 802, 804, and 808 can respond to the corresponding portion of the projection 808, the image can be displayed or amplified as described above. Moreover, the alignment of images displayed by individual screens 802, 804, and 808 are substantially independent of the screen placement. That is, elements of an image that have a particular relationship within the projection will be incident on the pixels of the screens 802, 804, and 808 that have substantially the same relationship. For example, image elements of the projection 808 that are two feet apart will be incident on pixels of the screens 802, 804, and 808 that are two feet apart.

In an embodiment, the screens 802, 804, and 808, or the like can be used to create displays of varying sizes, shapes, aspect ratios, or the like. For example, individual screens can be combined together to create a desired screen size. The screens can be purchased, rented, or the like in an amount to create the desired size. Accordingly, a dealer need not stock multiple screen sizes as a variety of sizes can be formed from a larger stock of individual screens.

Moreover, the granularity of the screens can be used to create irregular screen shapes. That is, not only may the shape of the array 800 depart from 4:3, 16:9, or other aspect ratios, the array can have non-rectangular shapes. In addition, as the screens of the array 800 can be substantially independent, the screens can be reorganized into other shapes as desired.

In an embodiment, using the screens described above, the array 800 can be tolerant of misalignment of individual screens. In this embodiment, screens 802 are substantially aligned with each other. Screens 804 and 806 are misaligned. However, as the projection 808 can substantially control the location of the apparent image on the screens 802, 804, and 808, image error due to misalignment can be reduced. Some portions of the projection 808, such as portions within region 810 between screens 804 and 806, may not be displayed. In addition, a region 812 of screen 806 which may have produced an image may not due to misalignment. However, the images displayed by screens 804 and 806 can maintain the alignment with each other, and with the other screens 802.

Figure 9:
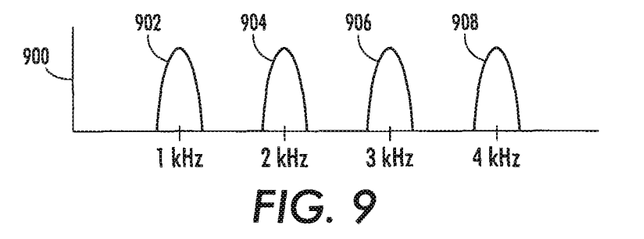
FIG. 9 is a spectrum of a modulated projector's emission according to an embodiment.

FIG. 9 is a spectrum of a modulated projector's emission according to an embodiment. As described above, a projection incident on a screen need not be encoded as an image that could be displayed on a passive screen. In this embodiment, a spectrum 900 of channels within a projection is illustrated. Channels 902, 904, 906, and 908 are illustrated on subcarriers at 1 kHz, 2 kHz, 3 kHz, and 4 kHz. However, the frequencies, spacing, spectral shapes, or the like described here are only for ease of explanation. The channels can be selected to have any desired spacing and/or modulation to avoid crosstalk, account for filter bandwidths, or the like as desired.

In an embodiment, these channels can be subcarriers of an optical signal. That is, rather than being amplitude modulated with an intensity of light corresponding to an intensity of the image, the optical signal can be modulated with the subcarriers 902, 904, 906, and 908. Furthermore, the spectrum 900 can represent the sensed optical signal, obtained for example, after filtering, detection, or the like, and may not represent the actual optical signal spectrum. For example, the spectrum 900 can represent the sensed optical signal after detection in a photodetector.

The channels can be selected or spaced as desired. In an embodiment, a video image may be updated at a rate of 60 Hz. However, depending on the modulation technique the bandwidth can be larger or smaller. In this example, the channels are spaced at 1 kHz, however, other channel spacing can be used as desired.

Figure 10:
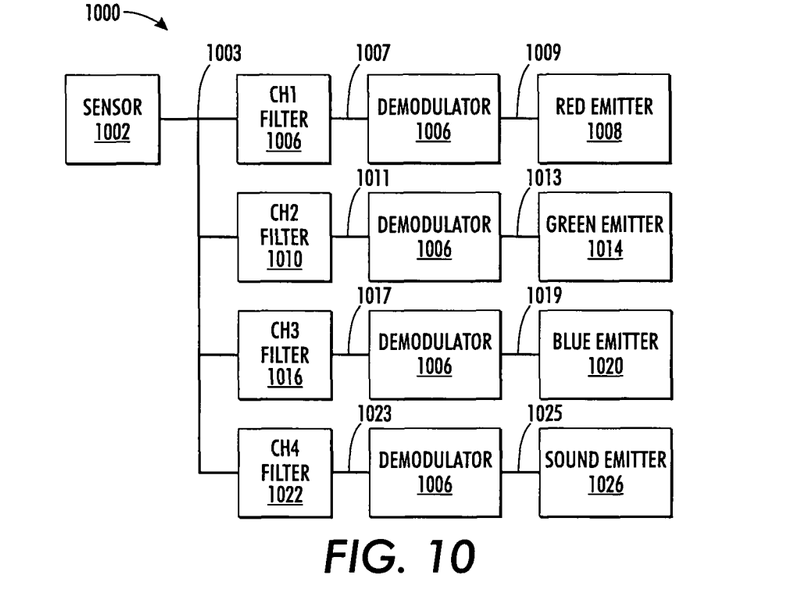
FIG. 10 is a block diagram of a pixel configured to process the spectrum of FIG. 9 according to an embodiment.

FIG. 10 is a block diagram of a pixel configured to process the spectrum of FIG. 9 according to an embodiment. In this embodiment, the pixel 1000 includes a sensor 1002. The sensor 1002 can be configured to sense the modulated signal in the corresponding projection. The sensed signal 1003 can have the spectrum 900 as illustrated in FIG. 9.

For each channel 902, 904, 906, and 908 of the spectrum 900, a corresponding filter 1006, 1010, 1016, and 1022 can filter out the desired channel. In an embodiment, the filters 1006, 1010, 1016, and 1022 can be analog filters acting on an analog sensed signal 1003. In another embodiment, the filters 1006, 1010, 1016, and 1022 can be digital filters acting on a digitized sensed signal 1003.

Regardless, of the form, each filter 1006, 1010, 1016, and 1022 can filter out the corresponding channel 1007, 1011, 1017, and 1023. The filtered channels can be input into demodulators 1008, 1012, 1018, and 1024. The demodulated signals 1009 1013, 1019, and 1025 can be used to drive emitters 1008, 1014, 1020, and 1026.

In this embodiment, the emitters are a red emitter 1008, a green emitter 1014, a blue emitter 1020, and a sound emitter 1026. Accordingly, channels 902, 904, 906, and 908 can correspond to a red signal, a green signal, a blue signal, and audio to be emitted by the corresponding emitters. That is, color information, audio information, or the like can be decoded from the sensed signal 1003 and used to emit corresponding signals from the emitters.

Although a particular modulation and demodulation technique has been described above, any signal encoding and decoding technique can be used. In an embodiment, the envelope of the AM signal can be the intensity information itself. That is, if the AM carrier was light in a visible spectrum, the image formed by the projection could be the desired image.

In another embodiment, pulse width modulation (PWM) could be used. The duty cycle can be encoded with the intensity information. However, in another embodiment, the information conveyed in the signal can have the intensity encoded within it, along with other information. For example, a digital number corresponding to the intensity could be encoded.

In another embodiment, frequency modulation techniques can be used. For example, with frequency modulation, the projection can have a substantially constant intensity as the information is conveyed in the frequency. Similarly, phase modulation can be used. In particular, the phase and/or frequency modulation can be the modulation of the signal, rather than the phase of the light.

In an embodiment, the information can be encoded such that the projection on a passive surface can convey the intensity information, yet similar information and/or other information is also transmitted. For example, an FM signal can be used where the average intensity is the desired intensity, but the frequency modulation conveys additional information. In another example, using PWM, the pulse amplitude can be adjusted along with the pulse width to maintain an average intensity while the intensity is also encoded in the pulse width. As a result, when the projection is incident on a passive screen, the desired image can be displayed, even though the passive screen is not configured to process any information encoded in the projection. When the same projection is incident on a screen as described herein, the information encoded can be decoded and the displayed image adjusted, modified, amplified, or the like as desired.

Any other modulation techniques, such as phase modulation, quadrature amplitude modulation, phase shift keying, or the like can be used. The circuitry of the pixels can include the corresponding receivers configured to decode the information Although the circuitry for filtering and decoding the channels has been described as substantially independent, the channels could interact with one another. For example, the color information may be encoded in a color space different from red-green-blue (RGB). Accordingly, the demodulated signals 1009, 1013, and 1019 could be combined to perform a color space conversion. Moreover, the emitters may not be strictly red, green, and blue emitters. Thus, the demodulated signals 1009, 1013, and 1019 could be combined to account for such differences.

Moreover, although frequency division has been described above in multiplexing multiple channels into one signal, other multiplexing techniques can be used. For example, timedivision-multiplexing can be used. Each color, data channel, or the like can be assigned a time slice of a projected signal. The circuitry can be configured to decode these channels.

In an embodiment, a data channel can be decoded from a projection. For example, a meta-data channel including information beyond explicit information related to emissions can be encoded in the projection. For example, additional information associated with the screen, the projector, an installation setup, or the like can also be transmitted. As described above, the identification of a projector can be conveyed in such a meta-data channel. In an embodiment, the channel 908 described with reference to FIG. 9 could be a meta-data channel.

Figure 11:
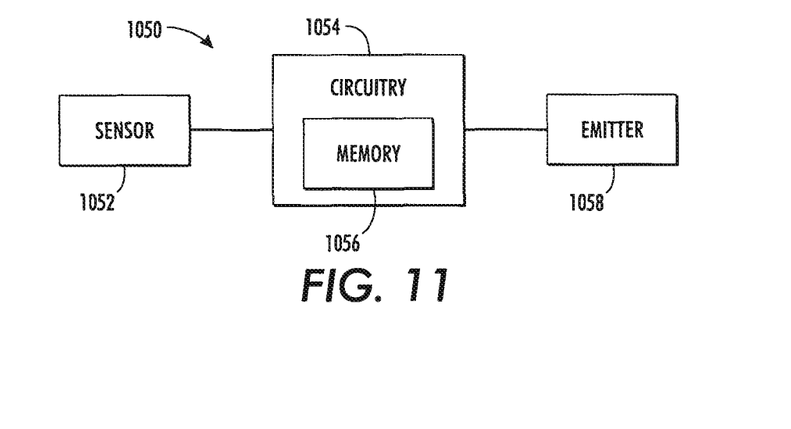
FIG. 11 is a block diagram of a pixel with memory according to an embodiment.

FIG. 11 is a block diagram of a pixel with memory according to an embodiment. In this embodiment, the pixel 1050 includes a sensor 1052, circuitry 1054, and an emitter 1058 similar to the pixel 200 of FIG. 2. However, the circuitry 1054 of the pixel 1050 also includes a memory 1056. The memory 1056 can be implemented in a variety of ways. For example, the memory can include a register. The memory can include static or dynamic memory.

In an embodiment, a signal received through the sensor 1052 can be stored in the memory 1056. The stored signal can be used at a later time to actuate the emitter 1058. For example, an image can be projected on to a screen including with pixels 1050. The projected image can be stored by each pixel storing the correspondingly received signal. Then, even if the projection is removed, the screen can still emit an image that is based on the projection.

Although storing and continuously emitting have been given as an example of a use of the memory, a stored signal can be used in other ways. Moreover, the information stored in the memory need not be intensity information, or other information directly related to emissions. The information stored in the memory can be configuration information, control information, or the like for the pixel.

Figure 12:
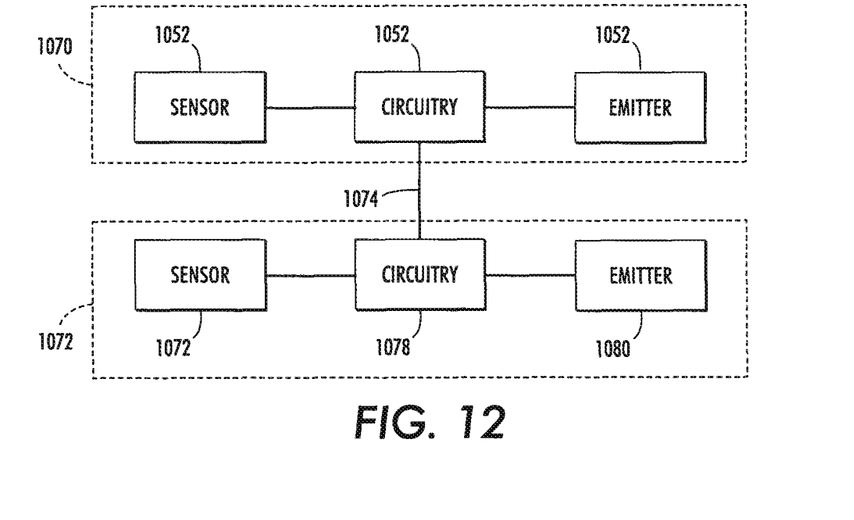
FIG. 12 is a block diagram of interconnected pixels of a screen according to an embodiment.

FIG. 12 is a block diagram of interconnected pixels of a screen according to an embodiment. In this embodiment, two pixels 1070 and 1072 are illustrated. However, in other embodiment, more pixels can be coupled together.

The pixels 1070 and 1072 are coupled together through connection 1074. The connection 1074 can connect the circuitry 1078 of pixel 1070 with the circuitry 1078 of pixel 1072. Accordingly, the circuitries 1078 can be configured such that the emitter 1080 of pixel 1070 can respond to a signal received by sensor 1076 of pixel 1072.

For example, in an embodiment, the projected image may not be a stable image, such as a projected image from a handheld source. Thus, the desired information for a particular pixel can be routed from the pixel on which it is incident to a desired pixel according to a stabilization algorithm. That is, information from a sensor of a pixel can be routed to an emitted of another pixel.

In another embodiment, the projected image can have pixels that are relatively larger than pixels of the screen. Accordingly, the emitted image may appear with spatial aliasing where, for example, aliasing can refer to the appearance of ragged lines and text, due to limited resolution. However, using interconnection of the pixels through connections such as connection 1074, the circuitry can be configured to perform an anti-aliasing function. As a result, quality of a lower resolution projected image can be improved. Moreover, the projected image can have a lower data rate due to the lower resolution. Thus, in an embodiment, the resolution of the projector does not need to be improved as much as the desired finesse of the aliasing would otherwise require. This is particularly pronounced with larger screens.

In another embodiment, the projection can include compressed information. Such information can correspond to an image to be projected, a portion of that image, or the like. The compressed information can be compressed according to any variety of image compression techniques. For example, the compressed information can include a Joint Photographic Experts Group (JPEG) style image, a Graphics Interchange Format (GIF) style image, or any other image or video compression style.

The projection including the compressed information can be incident on one or more pixels of the screen. The circuitry of the pixels can decompress the received image and display the decompressed image on the appropriate pixels. For example, one or more pixels of a group of pixels can receive and decode the image. Information can be transmitted to the pixels of the group, for example through the connection 1074, such that the decompressed image is displayed on the group of pixels.

In an embodiment, a pixel or a group of pixels can receive a block of a JPEG style image. The block can be transmitted by one pixel of the projected image. The receiving pixels of the screen can decode and display a decompressed image corresponding to that block. Here, the information can be a block of a larger image. However, in another embodiment, each pixel of the projection can include an independent image.

Accordingly, in an embodiment, lower spatial resolution, and hence potentially cheaper, projectors can be used to project an image on a screen that has an apparent higher resolution. For example, a single pixel of a projection generated by the projector can be incident on an array of pixels of a screen. Within the single pixel of the projection, a data stream can be encoded with a compressed image. Thus, the group of pixels of the screen that receive the single pixel of the projection can display the uncompressed image encoded in the data stream. As a result, a region of the screen that may have displayed a single pixel, if the single pixel was merely amplified, can become a more detailed image, namely that of the uncompressed image.

As described above, additional information can be encoded in the projection. In an embodiment, each pixel including a compressed image can include an identifier that distinguishes the compressed image from adjacent compressed images, any other compressed images of the projection, or the like. Thus, each of the pixels that receives a single compressed image as described above, can determine that the pixels are part of a group and should display the compressed image. However, pixels outside of that group, which can receive a compressed image with a different identifier, can display a different image.

Although image compression has been referred to in the context of a single image, such as a JPEG or GIF image, the data stream encoded in a single pixel or group of pixels can be encoded as desired, including, for example, with compressed video information. For example, the data stream can encode video according to a variety of standards of the Motion Pictures Expert Group (MPEG), such as, MPEG-2, MPEG-4, or the like, International Telecommunication Union (ITU) video encoding standards, such as H.262, H.263, H.264, or the like, motion JPEG, or any other video compression format. The corresponding group of pixels can decode and display the corresponding video image.

Figure 13:
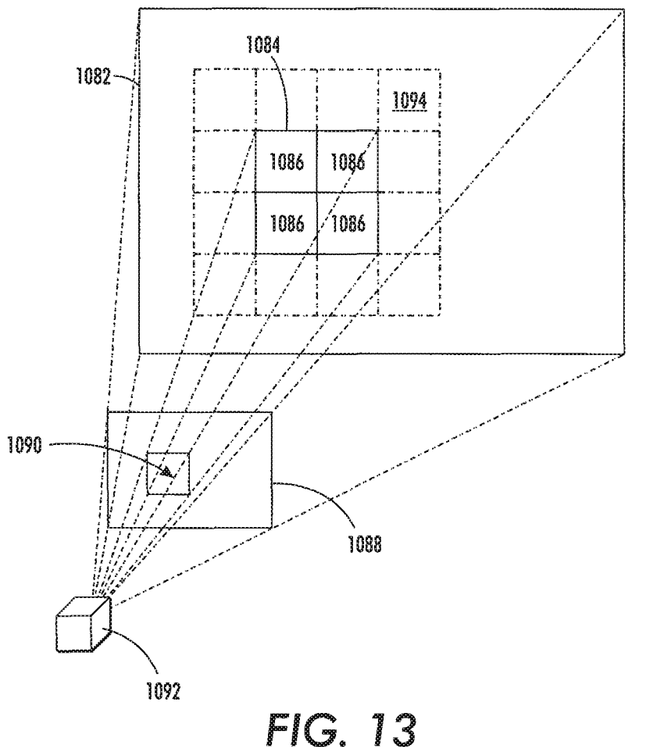
FIG. 13 is a bock diagram of a projection system according to an embodiment.

FIG. 13 is a bock diagram of a projection system according to an embodiment. The projector 1092 is configured to generate a projection with compressed information as described above. Virtual image 1088 includes a pixel 1090. The pixel 1090 is incident on region 1084 of the screen 1082. Region 1084 is formed of multiple pixels 1086. In this embodiment, four pixels 1086 are illustrated; however, the projected pixel 1090 could be incident on any number of pixels of the screen 1082.

As described above, the pixels 1086 can receive the compressed image information transmitted through projected pixel 1090. The pixels 1086 can display the corresponding decompressed image. That is, the image transmitted through pixel 1090 can be decompressed across pixels 1086 of the screen 1082. Using the connections described above, each pixel 1086 can display its corresponding portion of the decompressed image. For example, each pixel 1086 can be configured to determine that it has received the same pixel 1090 as the other pixels 1086. The pixels 1086 can be configured to coordinate the display of the decompressed image.

Other pixels 1094 outside of the region 1084 do not receive the projection of the pixel 1090. These pixels 1094 can receive other pixels of the projection 1088 and display corresponding decompressed images as described above.

Figure 14:
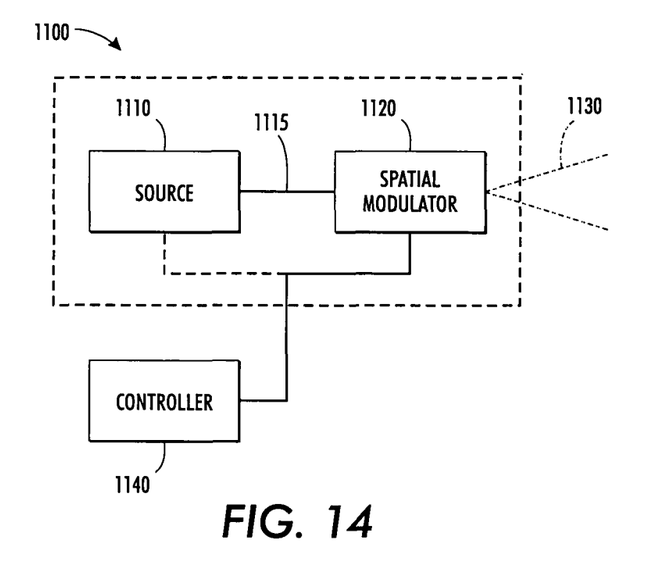
FIG. 14 is a block diagram of a projector according to an embodiment.

FIG. 14 is a block diagram of a projector according to an embodiment. The projector 1100 includes a source 1110, a spatial modulator 1120, and a controller 1140. The source 1110 is configured to generate a carrier 1115. For example, the source 1110 can be an incandescent lamp, one or more LEDs, a fluorescent lamp, or the like to generate light as the carrier.

Using light as an example of the carrier, the spatial modulator 1120 is disposed to modulate light 1115 from the source 1110 to generate spatially modulated light 1130. For example, the spatial modulator 1120 can include an LCD panel, a digital micromirror device, or the like. In particular, the spatial modulator 1120 can be configured to modulate the light 1115 such that different areas of a cross-section of the modulated light 1130 are encoded with different information.

As described above, the spatial modulator 1120 can operate as an external modulator for the source 1110. In another embodiment, the spatial modulator 1120 and the source 1110 can be combined into a spatially modulated signal source 1111. For example, the spatially modulated signal source 1111 can include one or more direct modulated lasers that are scanned using a system of mirrors, lenses, or the like. In other words, a portion of the spatial modulator 1120 can be a part of the source 1110, such as the control of the direct modulation, while another portion can be configured to control the spatial direction of the carrier 1115 modulated by the direct modulation.

The controller 1140 is coupled to the spatial modulator 1120 and is configured to cause the spatial modulator 1120 to spatially modulate the light 1115 to encode an image and additional information. The image can be a visual image. The image can be static or dynamic, as in a video projection. In another embodiment, the image can be the information that is to be amplified by a screen as described above. As the screen need not have visual emitters, the image projected need not correspond to a visual image. For example, the image can be particular amplitude and phase relationships for audio signals to be emitted from a screen. Moreover, even though the image may be generated from a visible light source, the image may not correspond to a visual image.

In an embodiment, both the source 1110 and the spatial modulator 1120 can be controlled by the controller 1140. For example, an LED used as the source 1110 can be modulated to create a carrier signal. For example, the LED could be amplitude modulated at 20 kHz. Thus, the detected spectrum of the output 1115 of the LED source 1110 would have a signal at 20 kHz.

A spatial modulator 1120, such as an LCD or a digital micromirror device, can modulate the output 1115 on a per pixel basis. As a result, the carrier in the LED output 1115 would be modulated on a per pixel basis.

In addition, in an embodiment, the frequency of the modulation of the source 1110 can be changed according to color. For example, as a color wheel rotates to a different color, the modulation of the source 1110 can be changed to a different carrier frequency. In another embodiment, where the source 1110 includes discrete color sources, such as a red LED, a green LED, and a blue LED, each LED can be modulated with a different frequency. Thus, a spectrum similar to the spectrum 900 of FIG. 9 can be created. Although particular examples of the modulation of the source 1110 have been given, the source 1110 can be modulated in other ways to produce the desired output spectrum.

In an embodiment, a projector such as an LCD projector, a DLP projector, or the like, can be retrofit with new components. For example, the light source 1110 of a projector can be replaced with a lower power source that would make the projector unsuitable for projecting an image on a conventional screen. However, if the projector with the lower power light source 1110 is used to project an image on a screen as described above, the projector can still be used for an intended application, even though alone, the projector would be unsuitable.

In another embodiment, the light source 1110 can be replaced with a light source having a different spectrum, wavelength, or the like. For example, a white light source can be replaced with an ultraviolet light source. The spatial modulator 1120 may still be configured to modulate such a light source. However, the emitted light 1130 may now be invisible. Again, the projector can be used to project an image on a screen and, as described above, the invisible projection can result in a visible displayed image on the screen.

In another embodiment, the modulation control of a projector can be modified. For example, the control of an LCD or DLP system, or other similar systems can be modified such that the modulation techniques described above can be used. While the modulation of individual pixels may have been controlled to generate an intensity with pulse width modulation, the pixels can also be controlled to encode information on intensity, color, data channels, or the like as described above. In particular, in an embodiment, the controller can be configured to encode data associated with the projector, a meta-data channel, or the like as described above in the modulated light 1130. Furthermore, the controller 1140 can be configured to control the spatial modulator 1120 to encode information, such as color information, in separate channels of the modulated light.

In an embodiment, the light source 1110 can be substantially monochromatic. In particular, the color information can be encoded in the monochromatic light, yet still be decoded on a screen as described above. Thus, color information can be conveyed with the transmission of modulated monochromatic light. As used herein, monochromatic can, but need not refer to a substantially single frequency range or wavelength of light. For example, monochromatic can refer to a white light source or other light source or spectrum that visually appears to be substantially a single color.

In an embodiment, the spatial modulator 1120 can be a pixelated modulator. The resulting modulated light 1130 can be pixelated as a result. In a projection system with the projector 1110 and a screen as described above, a pixel of the modulated light 1130 may not align with a pixel of the screen. For example, a screen may have a higher pixel density.

Accordingly, one pixel of the modulated light 1130 may impact multiple pixels of the display.

In another embodiment, the projection 1100 and a screen can be disposed such that the pixels of the modulated light substantially correspond on a one-to-one basis with pixels of the screen. Accordingly, the information modulated by one pixel of the spatial modulator 1120 will be substantially incident on one pixel of the screen. That is, the beam of light from pixel on the spatial modulator 1120 to the corresponding pixel of the screen can perform the function a data line that may have been present in the screen.

Although a light source has bee used as an example of the source 1110, as described above the carrier 1115 can be other types of signals. For example, the carrier 1115 can be an electron beam, a maser, or any other directional signal. The source 1110 can be configured to generate such signals.

As described above, an existing projector can be modified to perform the various functions described above. An embodiment can include a tangible computer readable medium on which is encoded code that, when executed by a computer, can cause the computer to substantially perform the above described functions. In an embodiment, the computer can be a processor or processing system of a projector. The code can be configured to cause the projector to perform one or more of the various functions described above. For example, the code can be a firmware update to an existing projector to allow the projector to encode information as described above. In another embodiment, the code can be a program loaded on to a pico-projector. The program can cause the pica-projector to project an image as described above.

Although particular embodiments have been described, it will be appreciated that the principles of the invention are not limited to those embodiments. Variations and modifications may be made without departing from the principles of the invention as set forth in the following claims.

What is claimed is:

1. A system, comprising:
   a substrate; and
   a plurality of pixels disposed on the substrate, each pixel including:
      a sensor configured to receive a first signal including information;
      an emitter; and
      circuitry configured to demodulate the information from the first signal and cause the emitter to emit a second signal in response to the information,
      the circuitry further configured to combine first signals received from sensors of other pixels.

2. The system of claim 1, wherein for each pixel:
   the circuitry is configured to extract color information from the first signal and cause the emitter to emit the second signal including colors corresponding to the color information.

3. The system of claim 1, wherein for each pixel:
   the emitter includes a plurality of emitters;
   the circuitry is configured to decode a plurality of channels from the first signal and actuate each of the plurality of emitters in response to a corresponding channel.

4. The system of claim 1, wherein the circuitry of at least one of the pixels is coupled to the circuitry of at least one other pixel and is configured to actuate the emitter of the pixel in response to a first signal received by a sensor of the at least one other pixel.

5. The system of claim 1, wherein for each pixel, the circuitry is configured to extract meta-data from the information and actuate the emitter in response to the meta-data.

6. The system of claim 1, wherein for each pixel, the circuitry is configured to actuate the emitter to emit the second signal with a greater intensity than the first signal.

7. The system of claim 1, wherein for each pixel:
   the circuitry includes a power input configured to supply power to the emitter and disposed substantially coplanar with the pixels; and
   the sensor is configured to sense the first signal from a direction substantially non-coplanar with the pixels.

8. The system of claim 1, wherein for each pixel:
   the circuitry includes a memory configured to store the information; and
   the circuitry is configured to actuate the emitter in response to the information stored in the memory.

9. The system of claim 1, wherein:
   the substrate includes a plurality of substrates separate from one another; and
   each substrate includes a plurality of pixels disposed on the substrate, each pixel including:
      a sensor configured to receive a first signal including information;
      an emitter; and
      circuitry configured to cause the emitter to emit a second signal in response to the information.

10. The system of claim 1, wherein the pixels are non-uniformly disposed on the substrate.

11. The system of claim 1, wherein for each pixel, the circuitry is configured to distinguish the first signal from ambient signals.

12. A method, comprising:
   a sensor of a first pixel receiving a first signal;
   a sensor of a second pixel receiving another first signal;
   circuitry of the first pixel combining the first signals received by the first pixel and the second pixel; and
   an emitter of the first pixel emitting a second signal from the first pixel in response to the combined first signals.

13. The method of claim 12, further comprising:
   decoding color information from the first signal; and
   emitting the colors associated with the color information.

14. The method of claim 13, further comprising decoding a data channel from the first signal.

15. The method of claim 12, further comprising emitting the second signal in response to a signal received by another pixel.

16. The method of claim 12, further comprising:
   receiving a plurality of signals at the pixel of the screen;
   decoding an identification of at least one of the signals; and
   emitting the second signal in response to the identification.

* * * * *